(12) United States Patent
Shi et al.

(10) Patent No.: US 11,153,606 B2
(45) Date of Patent: Oct. 19, 2021

(54) FACE REGION DETECTION BASED LIGHT FIELD VIDEO COMPRESSION

(71) Applicant: SHANGHAITECH UNIVERSITY, Shanghai (CN)

(72) Inventors: Zhiru Shi, Shanghai (CN); Qiang Hu, Shanghai (CN)

(73) Assignee: ShanghaiTech University, Shanghai (CN)

(*) Notice: Subject to any disclaimer, the term of this patent is extended or adjusted under 35 U.S.C. 154(b) by 0 days.

(21) Appl. No.: 16/891,622

(22) Filed: Jun. 3, 2020

(65) Prior Publication Data

US 2020/0296419 A1 Sep. 17, 2020

Related U.S. Application Data

(63) Continuation of application No. PCT/CN2018/119643, filed on Dec. 7, 2018.

(30) Foreign Application Priority Data

Dec. 8, 2017 (WO) ................ PCT/CN2017/115335

(51) Int. Cl.
*H04N 19/597* (2014.01)
*H04N 19/167* (2014.01)
(Continued)

(52) U.S. Cl.
CPC ....... *H04N 19/597* (2014.11); *G06K 9/00255* (2013.01); *H04N 19/167* (2014.11); *H04N 19/172* (2014.11)

(58) Field of Classification Search
None
See application file for complete search history.

(56) References Cited

U.S. PATENT DOCUMENTS 8,179,981 B2 5/2012 Chen et al.
2003/0231797 A1 12/2003 Cullen et al.
(Continued)

FOREIGN PATENT DOCUMENTS

CN 101395923 A 3/2009
CN 101883291 A 11/2010
(Continued)

OTHER PUBLICATIONS

Taguchi et al. "View-dependent scalable coding of light fields using ROI-based techniques," Proc. SPIE 6392, ThreeDimensional TV, Video, and Display V, 63920C (Oct. 17, 2006); doi: 10.1117/12.685627, Event: Optics East 2006, 2006, Boston, Massachusetts, United States (Year: 2006).*

(Continued)

*Primary Examiner* — Frederick D Bailey
(74) *Attorney, Agent, or Firm* — Sheppard Mullin Richter & Hampton LLP

(57) ABSTRACT

A method of perceptual video coding based on face detection is provided. The method includes calculating a bit allocation scheme for coding a light field video based on a saliency map of the face, calculating an LCU level Lagrange multiplier for coding a light field video based on a saliency map of the face and calculating an LCU level quantization parameter for coding a light field video based on a saliency map of the face.

18 Claims, 5 Drawing Sheets

(51) Int. Cl.
*H04N 19/172* (2014.01)
*G06K 9/00* (2006.01)

(56) References Cited

U.S. PATENT DOCUMENTS

| | | | | |
|---|---|---|---|---|
| 2011/0235706 A1* | 9/2011 | Demircin | ............. | H04N 19/126 |
| | | | | 375/240.03 |
| 2013/0106844 A1* | 5/2013 | Hong | ................... | H04N 13/128 |
| | | | | 345/419 |
| 2014/0270553 A1* | 9/2014 | Zund | ...................... | H04N 19/14 |
| | | | | 382/233 |

FOREIGN PATENT DOCUMENTS

| | | |
|---|---|---|
| CN | 104469372 A | 3/2015 |
| CN | 105049850 A | 11/2015 |
| CN | 106937118 A | 7/2017 |

OTHER PUBLICATIONS

Meddeb et al. "Region-of-interest-based rate control scheme for high-efficiency video coding", APSIPA Transactions on Signal and Information Processing 3 DOI:10.1017/ATSIP.2014.15 (Year: 2014).*
Xu et al., "Region-of-Interest Based Conversational HEVC Coding with Hierarchical Perception Model of Face", IEEE Journal of Selected Topics in Signal Processing, vol. 8, No. 3, Jun. 2014 (Year: 2014).*
PCT International Search Report and the Written Opinion dated Feb. 22, 2019, issued in corresponding International Application No. PCT/CN2018/119643 (10 pages).

\* cited by examiner

FACE REGION DETECTION BASED LIGHT FIELD VIDEO COMPRESSION

CROSS-REFERENCE TO RELATED APPLICATIONS

This application is a continuation application of International Patent Application No. PCT/CN2018/119643, filed on Dec. 7, 2018, which is based on and claims priority of the International Patent Application No. PCT/CN2017/115335, filed on Dec. 8, 2017. The above-referenced applications are incorporated herein by reference in their entirety.

TECHNICAL FIELD

This specification relates to the field of computer technologies, and in particular, to a face region detection based light field video compression method and device.

BACKGROUND

In a representative light field video system, 7 high resolution videos and two depth maps are captured by the light field array system. The huge amount of light field data presents a challenge for data compression and transmission. High Efficiency Video Coding (HEVC) standard has been developed to provide higher compression efficiency for such bandwidth intensive applications. In HEVC, the video frames are partitioned into sequences of largest coding units (LCUs), which can be recursively divided into four equally sub-CUs. In conventional video coding framework, the Lagrange multiplier and quantization parameter of LCUs are constants, which means that all the LCUs are considered equally for bit allocation after getting the prediction residual. But such arrangement may not result in optimal coding performance as the Human Vision System (HVS) focuses on the regions with more perceptible information. In other words, there is too much perceptual redundancy, since human attentions do not focus on the whole scene, but only a small region called region-of-interest (ROI). For light field video sequences, regions with the human face often receive more visual attention. Moreover, in light field camera system designed for face detection and recognition purpose, the regions with human faces should be treated as ROI.

SUMMARY

This specification provides a method of light field video coding. The method may include: determining a region of interest in a light field video; assigning a visual attention value to the region of interest, wherein the visual attention value is different from that for other regions of the light field video; calculating a bit allocation scheme based on the visual attention value of the region of interest; and encoding the light field video frame based on a bit allocation scheme.

In some embodiments, the region of interest may contain a human face.

In some embodiments, the region of interest may contain a feature of a human face.

In some embodiments, the visual attention value may be determined based on a saliency map of the human face.

In some embodiments, a subjective rate-distortion optimization may be performed to allocate more resources to the region of interest.

In some embodiments, the method may further include calculating the bit allocation scheme in accordance to:

$$R'_n = \frac{A_n}{\sum_{i=1}^{N} A_i} \cdot R_{frame}$$

$$A_n = \frac{\sum_{i=1}^{N_b} f_i}{N_b}$$

wherein $R_{frame}$ is the total bits of a video frame, N is the number of coding units in a video frame, $R_n$ is the allocated bits for the $n^{th}$ coding unit, $A_n$ represents the visual attention value of the $n^{th}$ coding unit in a video frame, $f_i$ is the visual attention value of a pixel, and denotes the set of blocks in a coding unit area, and $N_b$ is the number of pixels in the coding unit.

In some embodiments, the method may further include calculating an LCU level Lagrange multiplier in according to $$\lambda_{new} = \left(\frac{A_n}{A_{avg}}\right)^{\beta} \Box \lambda,$$

wherein $A_{avg}$ is the average visual attention value.

In some embodiments, β may be set to −0.9.

In some embodiments, $$\frac{A_n}{A_{avg}}$$

may be set in a range from 0.5 to 2.

In some embodiments, the method may further include calculating an LCU level quantization parameter in according to $$QP_{new} = QP + 3\beta \Box \log\left(\frac{A_n}{A_{avg}}\right).$$

This specification further provides a light field video system. The system may include: a light field array system for capturing a plurality of videos and a plurality of depth maps to generate a light field video; a processer; and a memory that stores at least one program to control the light field video system.

The processor may be configured to execute the program for: determining a region of interest in the light field video; assigning a visual attention value to the region of interest, wherein the visual attention value is different from that for other regions of the light field video; calculating a bit allocation scheme based on the visual attention value of the region of interest; and encoding the light field video frame based on a bit allocation scheme.

In some embodiments, the region of interest may contain a human face.

In some embodiments, the region of interest may contain a feature of a human face.

In some embodiments, the visual attention value may be determined based on a saliency map of the human face.

In some embodiments, a subjective rate-distortion optimization may be performed to allocate more resources to the region of interest.

In some embodiments, the processor may be further configured to execute the program for calculating the bit allocation scheme in accordance to:

$$R'_n = \frac{A_n}{\sum_{i=1}^{N} A_t} \cdot R_{frame}$$

$$A_n = \frac{\sum_{i=1}^{N_b} f_i}{N_b}$$

wherein $R_{frame}$ is the total bits of a video frame, N is the number of coding units in a video frame, $R_n$ is the allocated bits for the $n^{th}$ coding unit, $A_n$ represents the visual attention value of the $n^{th}$ coding unit in a video frame, $f_i$ is the visual attention value of a pixel, and denotes the set of blocks in a coding unit area, and $N_b$ is the number of pixels in the coding unit.

In some embodiments, the processor may be further configured to execute the program for calculating an LCU level Lagrange multiplier in according to $$\lambda_{new} = \left(\frac{A_n}{A_{avg}}\right)^{\beta} \square \lambda,$$

wherein $A_{avg}$ is the average visual attention value.

In some embodiments, β may be set to −0.9.

In some embodiments, $$\frac{A_n}{A_{avg}}$$

may be set in a range from 0.5 to 2.

In some embodiments, the processor may be further configured to execute the program for: calculating an LCU level quantization parameter in according to $$QP_{new} = QP + 3\beta \square \log\left(\frac{A_n}{A_{avg}}\right).$$

DETAIL DESCRIPTION OF SOME EMBODIMENTS

Figure 1:
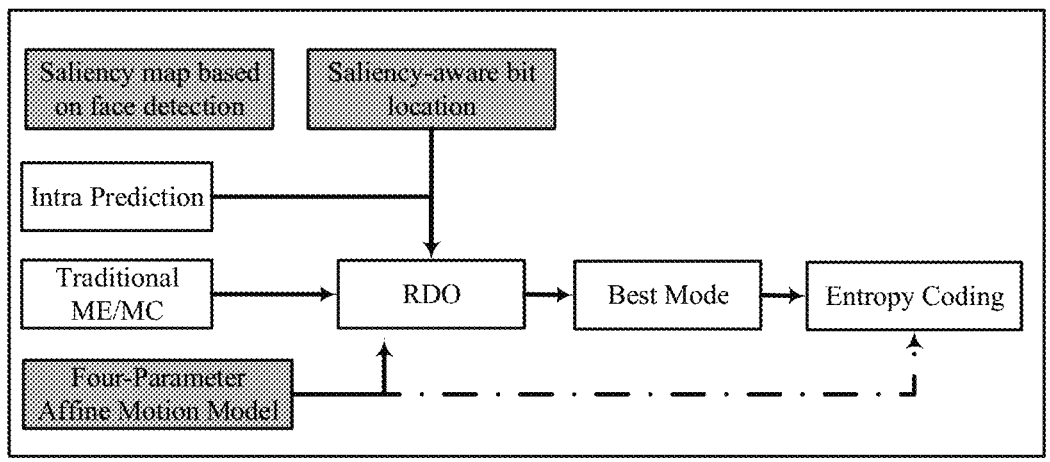
FIG. 1 shows overall architecture of the perceptual rate-distortion optimization (RDO) scheme for omnidirectional video coding.

In this disclosure, a perceptual light field video coding approach based on face detecting is provided. Perceptual video coding is designed to reduce the perceived redundancy by enhancing the visual quality of the face region at the cost of the quality in other regions. Thus, it is an effective solution to transmit a large amount of video data in light field system. Specifically, a perceptual model of multiple faces for videos is provided. To this end, a method is developed to detect face and facial features of multiple faces in light field system. Then, different weights are assigned to different regions in a video frame with one or more faces. Based on such weights, a subjective rate-distortion optimization was performed to improve the quality of regions with important information, such as face and facial features. Experimental results showed that this approach produces better face recognition quality than HEVC.

1. Face Region Weighted Based LCU Level Rate Control Scheme

The frames in a natural video cannot be considered as a stack of independent still images, since they also contain critical motion information related to these images. Moreover, perception of motion information between frames is an important feature for video quality assessment (VQA). In the conventional video coding framework such as HEVC, once the prediction residual is obtained, all the LCUs are considered equally for bit allocation, which leads to a constant lamda and QP at LCU level. This approach does not conform with HVS, because the perceptual information of LCUs in each frame is different, and the fixed lamda and QP can hardly result in optimum bits allocation. Thus, a novel bit-rate allocation strategy based on the perceptual model of faces is provided in accordance with embodiments of the present invention.

In HEVC, the hyperbolic model is adopted to characterize the R-D relationship, which is expressed as $$\lambda = -\frac{\partial D}{\partial R} = \alpha \square R^{\beta} \quad (1)$$

where α and β are parameters. As we analyzed above, a constant lamda and QP at LCU level indicates that all the LCUs are considered equally for bit allocation after getting the prediction residual in the conventional video coding framework, which can be expressed as $$R_n = \frac{R_{frame}}{N} \quad (2)$$

where $R_{frame}$ is the total bits of a frame, N is the number of LCUs in the frame, $R_n$ is the allocated bits for the $n^{th}$ LCU.

However, the capability of HVS to detect distortions in the video sequences must be taken into account to develop a video coder with better face recognition quality. More bits should be allocated to the LCUs where human can easily see coding distortions, and fewer bits should be allocated to the LCUs where coding distortions are less noticeable. Since face attracts extensive human visual attention, the proposed bit allocation scheme is calculated based on saliency map of face as follow:

$$R'_n = \frac{A_n}{\sum_{i=1}^{N} A_i} \cdot R_{frame} \quad (3)$$

$$A_n = \frac{\sum_{i=1}^{N_b} f_i}{N_b}$$

where $A_n$ represents the visual attention value of the $n^{th}$ LCU in a frame, $f_i$ is visual attention value of a pixel, denotes the set of blocks in a LCU area, and $N_b$ is the number of pixels in a LCU.

2. Adaptive LCU Level Lagrange Multiplier and Quantization Adjustment

By substituting Equations (2) and (3) into Equation (1), a new Lagrange multiplier can be obtained as follow:

$$\lambda_{new} = \left(\frac{A_n}{A_{avg}}\right)^\beta \cdot \lambda \quad (4)$$

where $A_{avg}$ is the average visual attention value. In this embodiment, $\beta$ is set to −0.9. To avoid the sudden change of Lagrange multiplier, the $$\frac{A_n}{A_{avg}}$$

is clipped into [0.5,2].

From Equation (4), we know that a LCU with smaller visual attention will have a larger $\lambda_{new}$, while a LCU with larger visual attention will have a smaller $\lambda_{new}$. As $\lambda_{new}$ is used to balance the distortion and rate, a smaller $\lambda_{new}$ brings a lower coding distortion with more coding bits, while a larger $\lambda_{new}$ results in a higher coding distortion with less coding bits. Thus, the proposed $\lambda_{new}$ does conform with HVS.

In addition, since Lagrange multiplier is generally modeled as a function of quantization parameter as follow:

$$\lambda = 0.85 \cdot 2^{(QP-12)/3.0} \quad (5)$$

where QP is the quantization parameter. By combining Equations (4) and (5), the new quantization parameter can be obtained as follow:

$$QP_{new} = QP + 3\beta \cdot \log\left(\frac{A_n}{A_{avg}}\right) \quad (6)$$

As shown from Equation (6), the LCUs with less visual attention are quantized more coarsely when compared with the perceptually important regions. By doing so, the perceptually less important regions such as background are compromised to save bits for the face regions. Moreover, there are more choices for perceptual optimization as the QP could vary in a range. Thus, we can get better visual quality at the same bit rate.

The overall architecture of the perceptual RDO scheme for omnidirectional video coding is exhibited in FIG. 1.

The experimental results of the proposed method are shown in FIGS. 2A-2F.

Figure 2A:
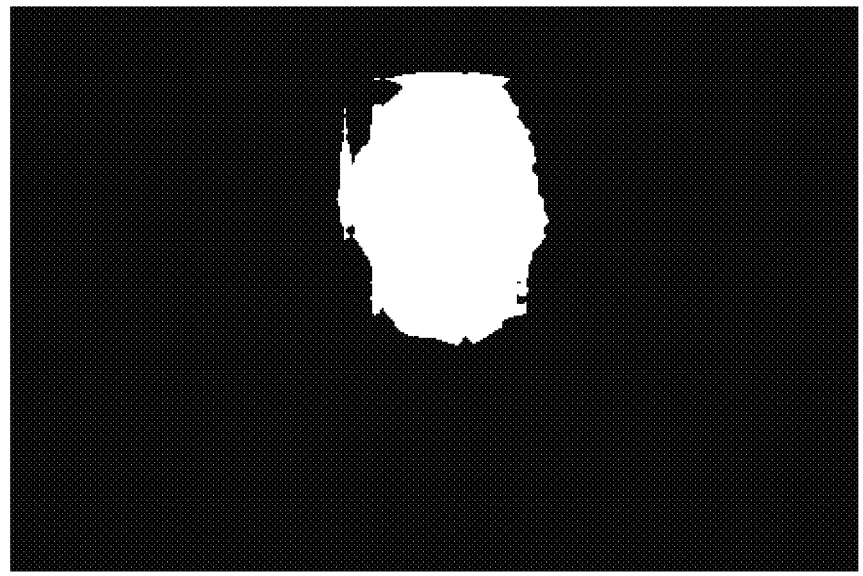
FIG. 2A is a schematic showing of face region detection, wherein a region of interest contains a human face.

FIG. 2A is a schematic showing of face region detection, wherein a region of interest contains a human face.

Figure 2B:
FIG. 2B is an image containing one face produced by the light field video compression method in accordance with an embodiment of the present invention.

FIG. 2B is an image containing one face produced by the light field video compression method in accordance with an embodiment of the present invention.

Figure 2C:
FIG. 2C is an image containing one face produced in accordance with the HEVC compression method.

FIG. 2C is an image containing one face produced in accordance with the HEVC compression method.

Figure 2D:
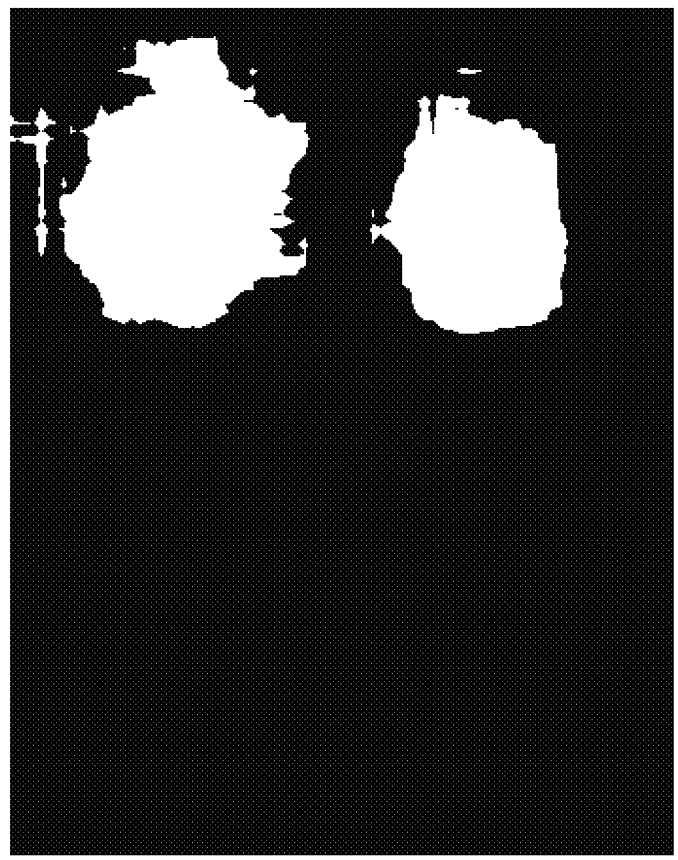
FIG. 2D is a is a schematic showing of face region detection, wherein a region of interest contains two human faces.

FIG. 2D is a is a schematic showing of face region detection, wherein a region of interest contains two human faces.

Figure 2E:
FIG. 2E is an image containing two faces produced by the light field video compression method in accordance with an embodiment of the present invention.

FIG. 2E is an image containing two faces produced by the light field video compression method in accordance with an embodiment of the present invention.

Figure 2F:
FIG. 2F is an image containing two faces produced in accordance with the HEVC compression method.

FIG. 2F is an image containing two faces produced in accordance with the HEVC compression method.

As shown in FIG. 2A-2F, this method provides better visual quality with fewer artifacts and smaller blurring in the face regions. Thus, the visual quality and peak signal to noise ratio (PSNR) in the face regions have been significantly improved.

The invention claimed is:

1. A method of light field video coding, comprising:
determining a region of interest in a light field video;
assigning a visual attention value to the region of interest, wherein the visual attention value is different from that for other regions of the light field video;
calculating a bit allocation scheme based on the visual attention value of the region of interest, wherein the bit allocation scheme is calculated in accordance to:

$$R'_n = \frac{A_n}{\sum_{i=1}^{N} A_i} * R_{frame}$$

$$A_n = \frac{\sum_{i=1}^{N_b} f_i}{N_b}$$

wherein $R_{frame}$ is the total bits of a video frame, N is the number of coding units in a video frame, $R_n$ is the allocated bits for the $n^{th}$ coding unit, $A_n$ represents the visual attention value of the $n^{th}$ coding unit in a video frame, $f_i$ is the visual attention value of a pixel, and denotes the set of blocks in a coding unit area, and $N_b$ is the number of pixels in the coding unit; and
encoding the light field video based on the bit allocation scheme.

2. The method of claim 1, wherein the region of interest contains a human face.

3. The method of claim 2, wherein the region of interest contains a feature of a human face.

4. The method of claim 2, wherein the visual attention value is determined based on a saliency map of the human face.

5. The method of claim 4, wherein a subjective rate-distortion optimization is performed to allocate more resources to the region of interest.

6. The method of claim 1, further comprising:
calculating an LCU level Lagrange multiplier in according to $$\lambda_{new} = \left(\frac{A_n}{A_{avg}}\right)^\beta \square\lambda,$$

wherein $A_{avg}$ is the average visual attention value.

7. The method of claim 6, wherein β is set to −0.9.
8. The method of claim 6, wherein $$\frac{A_n}{A_{avg}}$$

is set in a range from 0.5 to 2.

9. The method of claim 1, further comprising:
calculating an LCU level quantization parameter in according to $$QP_{new} = QP + 3\beta\square\log\left(\frac{A_n}{A_{avg}}\right).$$

10. A light field video system, comprising:
a light field array system for capturing a plurality of videos and a plurality of depth maps to generate a light field video;
a processer; and
a memory that stores at least one program to control the light field video system, wherein the processor is configured to execute the program for:
determining a region of interest in the light field video;
assigning a visual attention value to the region of interest, wherein the visual attention value is different from that for other regions of the light field video;
calculating a bit allocation scheme based on the visual attention value of the region of interest, wherein the bit allocation scheme is calculated in accordance to:

$$R'_n = \frac{A_n}{\sum_{i=1}^{N} A_i} * R_{frame}$$

$$A_n = \frac{\sum_{i=1}^{N_b} f_i}{N_b}$$

wherein $R_{frame}$ is the total bits of a video frame, N is the number of coding units in a video frame, $R_n$ is the allocated bits for the $n^{th}$ coding unit, $A_n$ represents the visual attention value of the $n^{th}$ coding unit in a video frame, $f_i$ is the visual attention value of a pixel, and denotes the set of blocks in a coding unit area, and $N_b$ is the number of pixels in the coding unit; and
encoding the light field video based on the bit allocation scheme.

11. The light field video system of claim 10, wherein the region of interest contains a human face.
12. The light field video system of claim 11, wherein the region of interest contains a feature of a human face.
13. The light field video system of claim 11, wherein the visual attention value is determined based on a saliency map of the human face.
14. The light field video system of claim 13, wherein a subjective rate-distortion optimization is performed to allocate more resources to the region of interest.
15. The light field video system of claim 10, wherein the processor is further configured to execute the program for:
calculating an LCU level Lagrange multiplier in according to $$\lambda_{new} = \left(\frac{A_n}{A_{avg}}\right)^\beta \square\lambda,$$

wherein $A_{avg}$ is the average visual attention value.

16. The light field video system of claim 15, wherein β is set to −0.9.
17. The light field video system of claim 15, wherein $$\frac{A_n}{A_{avg}}$$

is set in a range from 0.5 to 2.

18. The light field video system of claim 10, wherein the processor is further configured to execute the program for:
calculating an LCU level quantization parameter in according to $$QP_{new} = QP + 3\beta\square\log\left(\frac{A_n}{A_{avg}}\right).$$

* * * * *